(12) United States Patent
Bourke

(10) Patent No.: US 12,099,164 B2
(45) Date of Patent: *Sep. 24, 2024

(54) ZONE SPECIFIC AIRFLOW CONDITION FORECASTING SYSTEM

(71) Applicant: CPP Incorporated, Windsor, CO (US)

(72) Inventor: Peter A. Bourke, Sydney (AU)

(73) Assignee: CPP Incorporated, Windsor, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/733,827

(22) Filed: Apr. 29, 2022

(65) Prior Publication Data

US 2022/0252760 A1    Aug. 11, 2022

Related U.S. Application Data

(63) Continuation of application No. 16/041,592, filed on Jul. 20, 2018, now Pat. No. 11,391,865.

(51) Int. Cl.
| | | |
|---|---|---|
| *G01W 1/10* | (2006.01) | |
| *G01W 1/02* | (2006.01) | |
| *G06T 17/05* | (2011.01) | |
| *G06T 17/10* | (2006.01) | |
| *G06T 19/00* | (2011.01) | |

(52) U.S. Cl.
CPC .............. *G01W 1/10* (2013.01); *G01W 1/02* (2013.01); *G06T 17/05* (2013.01); *G06T 17/10* (2013.01); *G01W 2201/00* (2013.01); *G01W 2203/00* (2013.01); *G06T 19/00* (2013.01)

(58) Field of Classification Search
CPC ..... G01W 1/10; G01W 1/02; G01W 2203/00; G01W 2201/00; G06T 17/05; G06T 17/10; G06T 19/00
See application file for complete search history.

(56) References Cited

U.S. PATENT DOCUMENTS

| | | |
|---|---|---|
| 8,730,319 B2 | 5/2014 | Sekine et al. |
| 9,437,170 B1 | 9/2016 | Quevedo Montesdeoca |
| 9,714,089 B1 | 7/2017 | Louw et al. |
| | (Continued) | |

FOREIGN PATENT DOCUMENTS

| | | |
|---|---|---|
| CN | 105184423 A | 12/2015 |
| CN | 106096110 A | 11/2016 |
| | (Continued) | |

OTHER PUBLICATIONS

ForeFlight (Weather Layer Time Slider, Foreflight.com, Sep. 5, 2017) (Year: 2017).*

(Continued)

*Primary Examiner* — Manish S Shah
*Assistant Examiner* — Christian T Bryant
(74) *Attorney, Agent, or Firm* — Craig R. Miles; CR MILES P.C.

(57) ABSTRACT

A predictive real time and prospective environmental analysis and display system accessible by one or more client computing devices through a network to depict on the display surface of a computing device a graphical representation of a geographic environment which can be delimited into one or more two or three-dimensional zones in which visual indicators provide predicted current or prospective airflow speed or direction values associated with the geographic environment.

23 Claims, 11 Drawing Sheets

(56) References Cited

U.S. PATENT DOCUMENTS

| | | | |
|---|---|---|---|
| 10,656,171 | B1 | 5/2020 | Pleiman et al. |
| 11,054,547 | B2 | 7/2021 | Fewless et al. |
| 2005/0274178 | A1 | 12/2005 | Shin |
| 2007/0107510 | A1 | 5/2007 | Agami et al. |
| 2010/0265125 | A1 | 10/2010 | Kelly et al. |
| 2010/0313674 | A1 | 12/2010 | Dutel |
| 2014/0331750 | A1 | 11/2014 | Vander Hoek |
| 2015/0042479 | A1 | 2/2015 | Muetzel et al. |
| 2015/0142393 | A1 | 5/2015 | van den Berghe |
| 2016/0258974 | A1 | 9/2016 | Golovkin et al. |

FOREIGN PATENT DOCUMENTS

| | | |
|---|---|---|
| CN | 104699936 B | 5/2018 |
| CN | 105513133 | 5/2018 |
| JP | 2002049298 | 2/2002 |
| JP | 5685499 | 3/2015 |

OTHER PUBLICATIONS

U.S. Appl. No. 15/916,593, filed Mar. 9, 2018.
U.S. Appl. No. 15/916,593, Office Action mailed Sep. 16, 2020.
U.S. Appl. No. 17/144,251, filed Jan. 8, 2021.
U.S. Appl. No. 16/041,592, Office Action mailed Dec. 6, 2021.
PCT International Patent Application No. PCT/US18/43768, International Search Report and Written Opinion of the International Searching Authority dated Oct. 3, 2018, 9 pages.
PCT International Patent Application No. PCT/US19/13862, International Search Report and Written Opinion of the International Searching Authority dated Apr. 9, 2019, 15 pages.
European Patent Application No. 18926772.7, European Search Report dated Mar. 17, 2022, 12 pages.
PCT International Patent Application No. PCT/US21/65566, International Search Report and Written Opinion of the International Searching Authority dated Mar. 29, 2022, 16 pages.
Banks et al. Practical issues for pedestrian wind comfort prediction: surface-level wind speed sensors. CPP Wind Engineering and Air Quality Consultant, 2006, Fort Collins, Colorado.
Banks et al. Practical issues for pedestrian wind comfort prediction: surface-level wind speed sensors. Feb. 2006, 12th Australian Wind Engineering Society Workshop, Queenstown, New Zealand, 4 pages.
Banks et al. Practical issues for pedestrian wind comfort prediction: comfort criteria. Feb. 2006, 12th Australian Wind Engineering Society Workshop, Queenstown, New Zealand, 4 pages.
Corresponding European Patent Application No. 18926772.7, Office Action dated Jul. 7, 2023, 4 pages total.
Corresponding Canadian Patent Application No. 3,105,447, Office Action dated Aug. 4, 2023, 6 pages total.

* cited by examiner

ZONE SPECIFIC AIRFLOW CONDITION FORECASTING SYSTEM

I. FIELD OF THE INVENTION

A predictive real time and prospective environmental analysis and display system including a server accessible by one or more client computing devices through a network to depict on the display surface of a computing device a graphical representation of a geographic environment delimited into one or more two or three-dimensional zones in which visual indicators provide predicted real time or forecast airflow direction or speed associated with each of the two or three-dimensional zones delimited in the geographic environment.

II. SUMMARY OF THE INVENTION

A broad object of particular embodiments of the invention can be to provide a server computer including a server processor communicatively coupled to a server non-transitory computer readable media containing a computer program executable to correlate real time airflow direction or speed data generated by at least one airflow measurement device disposed at a geographic location, or airflow direction or speed forecast data generated by a least one forecast station, with fluid flow data associated with a spatially referenced three-dimensional model of a geographic environment to provide real time or forecast airflow speed or direction values associated with one or more two or three-dimensional zones in the geographic environment.

Another broad object of embodiment of the invention can be to provide a client computing device including a browser adapted to communicatively couple by a network to a server computer, the client computing device including a client processor communicatively coupled to a client non-transitory computer readable media containing a computer program executable to download from a server computer a graphical user interface depicting a graphical representation of a geographic environment which by user interaction can be delimited into one or more two or three-dimensional zones with associated visual indicators of predicted current or forecast airflow direction or speed values associated with each of one or more two or three-dimensional zones depicted in a graphical representation of a geographic environment.

Another broad object of particular embodiments of the invention can be to provide a graphical user interface depicting a graphical representation of a geographic environment which by user interaction can be delimited into one or more two or three-dimensional zones and which depicts visual indicators of predicted current or forecast airflow direction or speed values associated with each of the one or more two or three-dimensional zones depicted in the graphical representation of the geographic environment.

Naturally, further objects of the invention are disclosed throughout other areas of the specification, drawings, photographs, and claims.

III. BRIEF DESCRIPTION OF THE DRAWINGS

IV. DETAILED DESCRIPTION OF THE INVENTION

Figure 1:
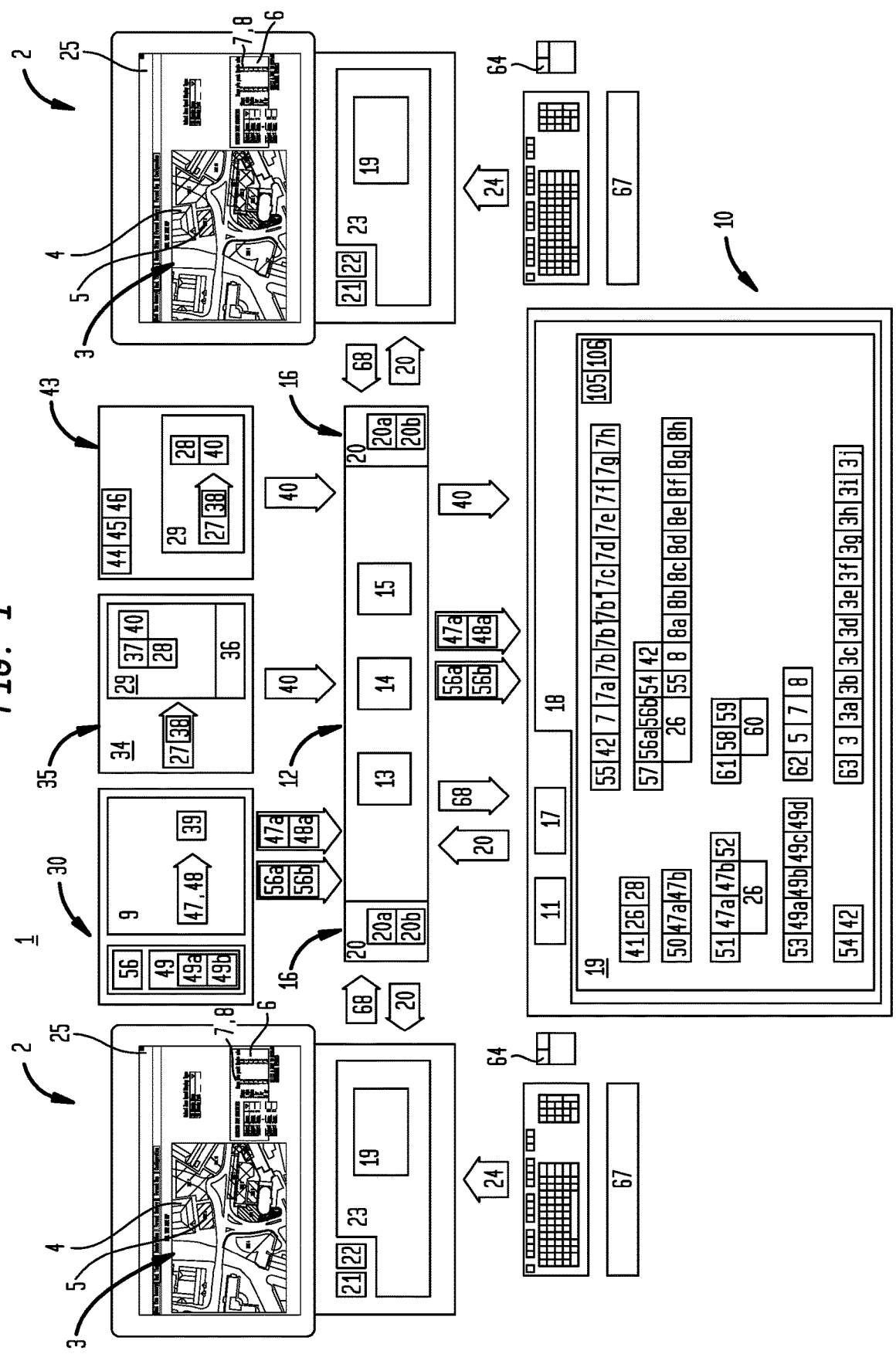
FIG. 1 is a block flow diagram of hardware and software elements included in a particular embodiment of a system which predicts real-time or forecast airflow direction or speed in one or more two or three-dimensional zones in a geographic environment.

Generally referring to FIGS. 1 through 11, a computer implemented environmental analysis and display system (1)

(also referred to as the "system") includes network elements, computer elements and software elements operable to support one or more client computing devices (2) served a graphical user interface (3) including a graphical representation of a geographic environment (4) including one or more two or three-dimensional zones (5) with associated graphical airflow indicators (6) depicting predicted real-time airflow direction or speed values (7) or forecast airflow direction or speed values (8) associated with each of the one or more two or three-dimensional zones (5) in a geographic environment (9).

Now referring primarily to FIG. 1, the system (1) can be disposed on one or distributed on a plurality of servers (10) each having a server network interface (11) operably coupled to a plurality of client computing devices (2) by a public network (12), such as the Internet (13), a cellular-based wireless network (14), or a local network (15) (each referred to individually or collectively as the "network"). The network (12) supports a plurality of communication resources (16) (along with other communication resources made available in the future) to afford as illustrative examples: recording, transmission, or reproduction of images (whether still or moving images), sound relating to acoustical, mechanical or electrical frequencies, electronic mail, instant messaging, text messaging (such as short message service) multimedia messaging (such as multimedia message service) each attributable to the execution of self-contained programs or pieces of software designed to fulfill particular purposes, as illustrative examples: web applications, online applications, mobile applications, downloadable from a server (10) or accessible by one or more client computing devices (2).

Figure 2:
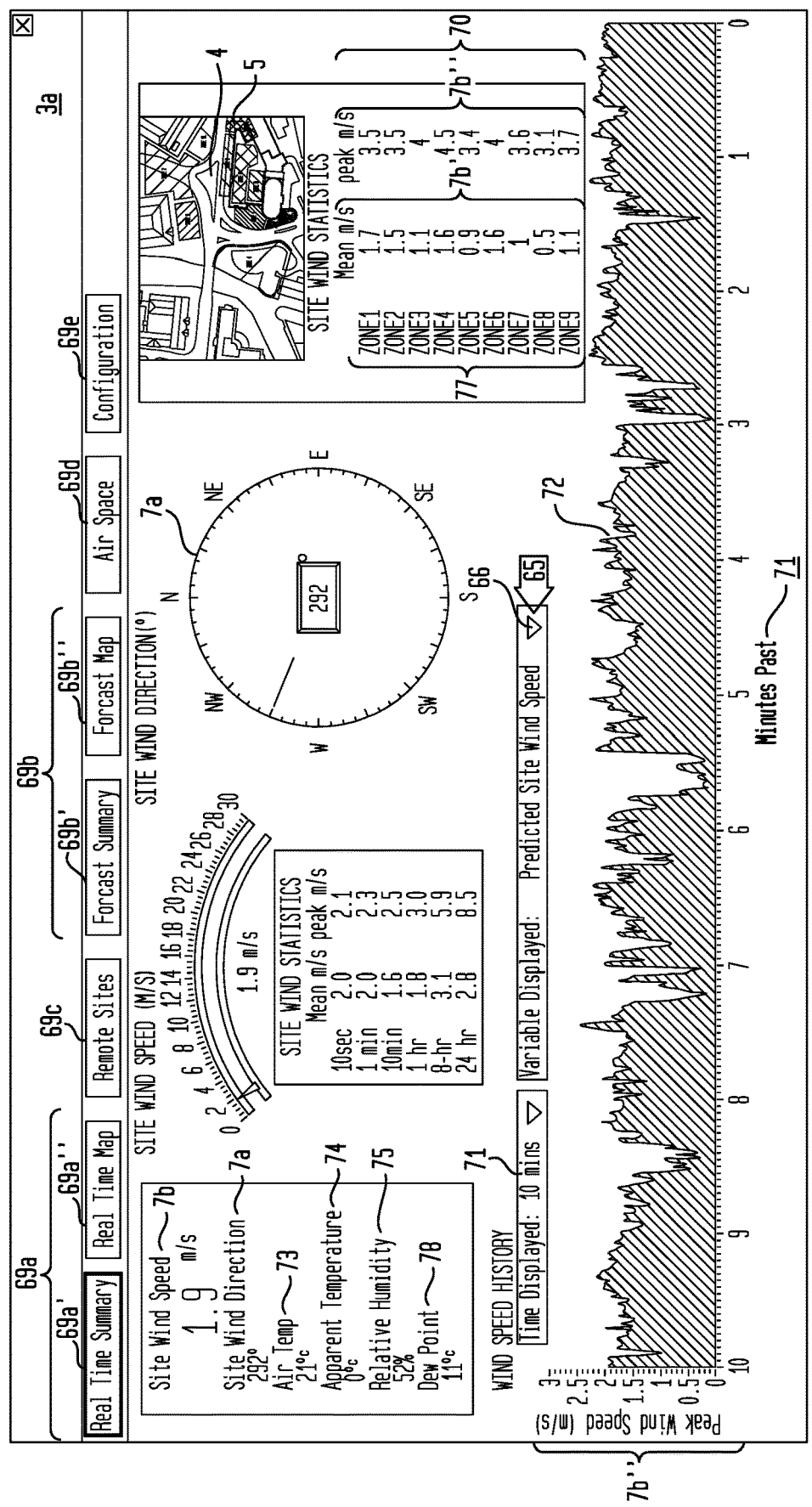
FIG. 2 is an illustration of a graphical user interface displayed on a display surface of a computing device including an embodiment of a page which includes predicted real-time airflow direction or speed values in one or more two or three-dimensional zones in a graphical representation of the geographic environment.

Now referring primarily to FIGS. 1 and 2, the server (10) can include a server processor (17) communicatively coupled to a server non-transitory computer readable media (18) (referred to as the "server memory") containing an environment analysis and display program (19) (also referred to as the "computer program"). The computer program (19) can be accessed, or downloaded in whole or in part, to one or more client computing devices (2) via the network (12) to correspondingly confer user interactive functionalities in and to the client computing devices (2) to provide client computing device content (20), as illustrative examples: Internet documents, graphics, audio, and video files, voice communication, electronic mail, instant messages.

In particular embodiments, the computer program (19) can be served and run in a web browser (21) of the client computing device (2) to confer all of the functions of the client computing device content (20) of the computer program (19) to each of the plurality of client computing devices (2). In particular embodiments, the computer program (18) can, but need not necessarily, be downloaded, in whole or in part, from the server (10) to a client computing device (2). The client computing device (2) can include a client device processor (22) communicatively coupled to a client device non-transitory computer readable media (23) (referred to as the "client device memory"). In particular embodiments, the computer program (18) can, but need not necessarily, be contained on and loaded to a client computing device (2) (or a plurality of client computing devices (2)) from one or more of: a computer disk, universal serial bus flash drive, or other computer readable media.

While embodiments of the computer program (19) are described in the general context of computer-executable instructions such as program modules which utilize routines, programs, objects, components, data structures, or the like, to perform particular functions or tasks or implement particular abstract data types, it is not intended that any embodiments be limited to a particular set of computer-executable instructions or protocols.

Again, referring primarily to FIG. 1, each one of the plurality of client computing devices (2) can include a web browser (21) (also referred to as a "browser"), as illustrative examples: Microsoft's INTERNET EXPLORER®, GOOGLE CHROME®, MOZILLA®, FIREFOX®, which functions to download and render computing device content (20) formatted in "hypertext markup language" (HTML). In this environment, the one or more servers (10) can contain the computer program (19) which implements the most significant portions of the graphical user interface(s) (3) including one or more graphical user interface pages (3a, 3b, 3c, 3d . . . ) (also referred to as "pages") including a combination of text and symbols selectable by user command (24) to execute the functions of the computer program (19). As to these embodiments, the one or more client computing devices (2) can use the web browser (21) to depict downloaded content on the display surface (25) of the client computing device (2) and to relay selected user commands (24) back to the one or more servers (10). The one or more servers (10) can respond by formatting additional user interface pages (3a, 3b, 3c, 3d . . . ) or downloading additional client computing device content (20).

Again, referring primarily to FIG. 1, in other embodiments, the one or more servers (10) can be used primarily as sources of client computing device content (20), with primary responsibility for implementing the graphical user interface (3) being placed upon each of the one or more client computing devices (2). As to these embodiments, each of the one or more client computing devices (2) can run the appropriate portions of the computer program (19) implementing the corresponding functions including but not limited to the depiction of the graphical user interface (3) and interface pages (3a, 3b, 3c, 3d . . . ).

Again, referring primarily to FIG. 1, the client computing device (2) can include a client device processor (22) communicatively coupled to a client device memory (23) which can, but need not necessarily, contain in whole or in part, the computer program (19), or operate the web browser (21), to implement the functionalities of the client computing device (2) in the system (1) and depict the graphical user interface (3) and by user command (24) implement the functionalities of the computer program (19). The client computing device (2) can as illustrative examples be: a desktop computing device, a mobile computing device, such as, personal computers, slate computers, tablet or pad computers, cellular telephones, smartphones, programmable consumer electronics, or combinations thereof.

In particular embodiments, the server (10) can receive and the computer program (19) can be executed to process fluid flow data (26) associated with fluid flows (27) measured at each of a plurality of location coordinates (28) in a spatially referenced three-dimensional model (29) of a geographic environment (9).

For the purposes of this invention, the term "geographic environment (9)" is intended to be broadly construed as a part of the Earth's surface (30) including any manmade structures or objects along with the corresponding airspace (32). As an illustrative example, without limitation in the breadth of the foregoing and with reference to FIG. 1, the geographic environment (9) includes a terrestrial landform including all the manmade modifications, structures, constructs and objects (whether or not permanent), such as buildings, stadiums, arenas, roadways, platforms, stages, vehicles, equipment, materials, and combinations thereof.

For the purposes of this invention, the term "geographic location (39)" means a position in relation to the Earth's surface (30) which can be defined by the use of two (longitude and latitude) or three coordinates (longitude, latitude and elevation).

Figure 3:
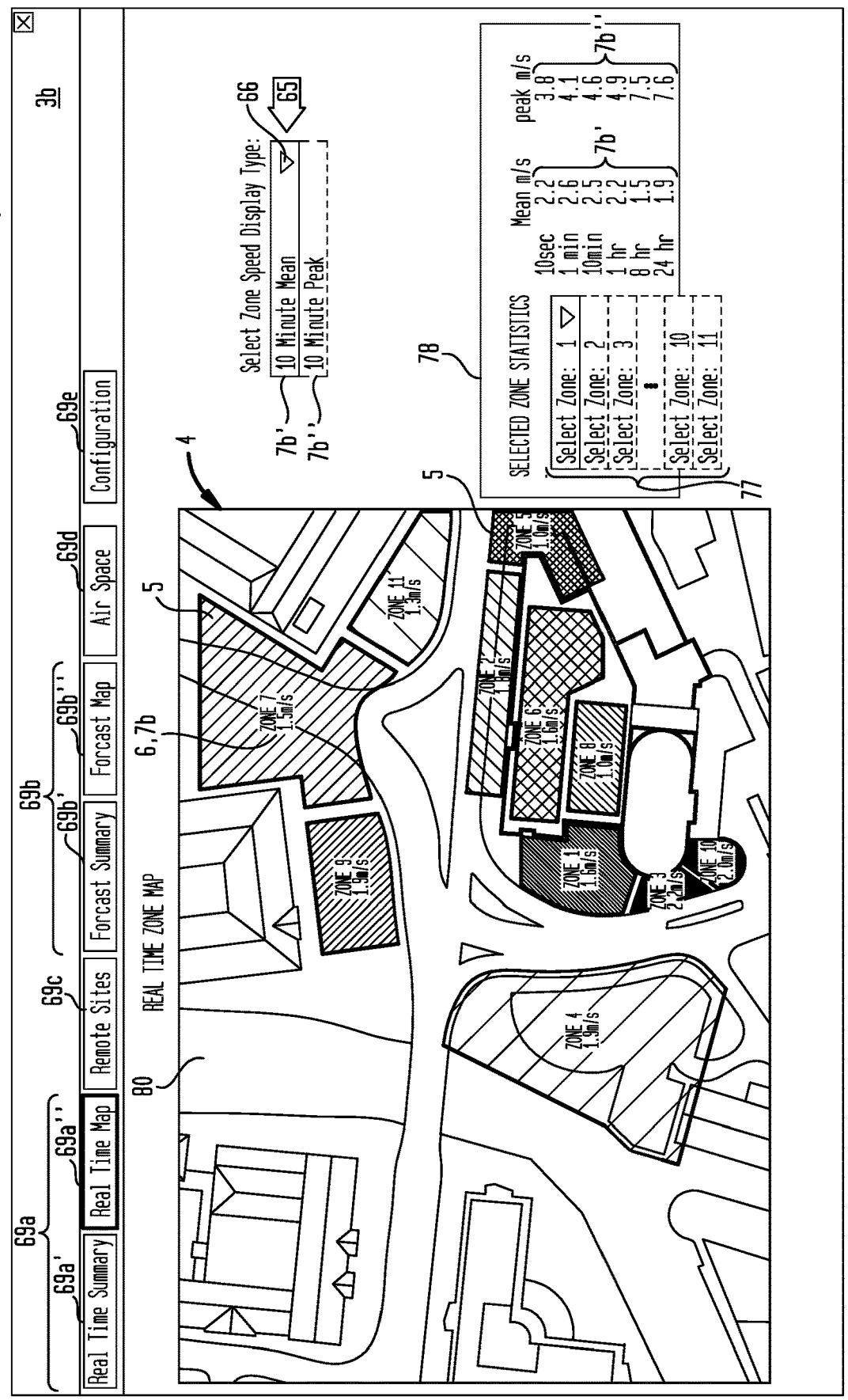
FIG. 3 is an illustration of a graphical user interface displayed on a display surface of a computing device including an embodiment of a page which includes predicted real-time airflow direction or speed values in one or more two or three-dimensional zones associated with terrestrial or manmade surfaces in a graphical representation of the geographic environment.
Figure 4:
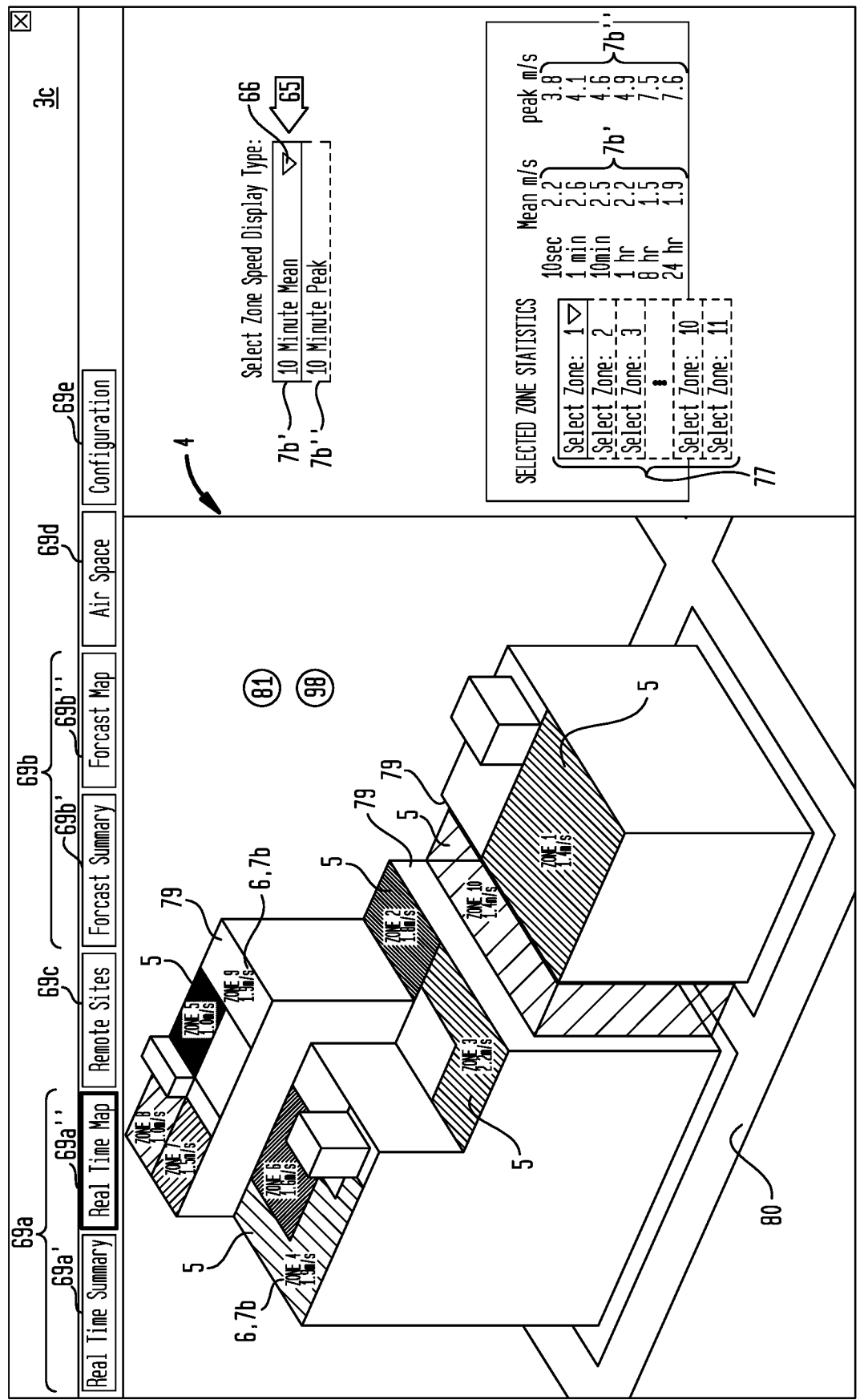
FIG. 4 is an illustration of a graphical user interface displayed on a display surface of a computing device including an embodiment of a page which includes predicted real-time airflow direction or speed values in one or more two or three-dimensional zones associated with building surfaces in a graphical representation of the geographic environment.
Figure 8:
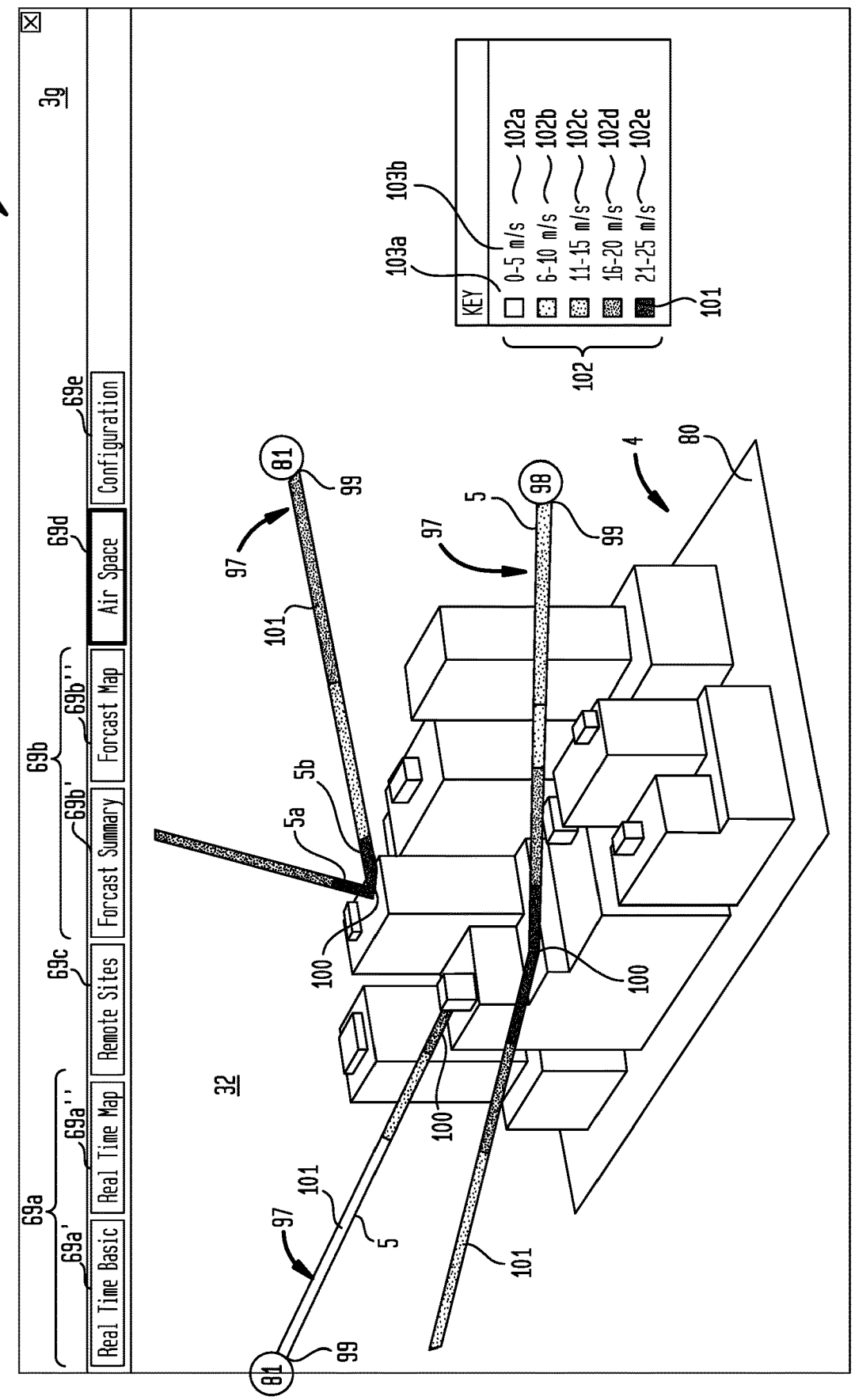
FIG. 8 is an illustration of a graphical user interface displayed on a display surface of a computing device including an embodiment of a page which includes predicted real-time or forecast airflow direction or speed values in one or more two or three-dimensional zones which bound a plurality of flight corridors for aircraft.
Figure 9:
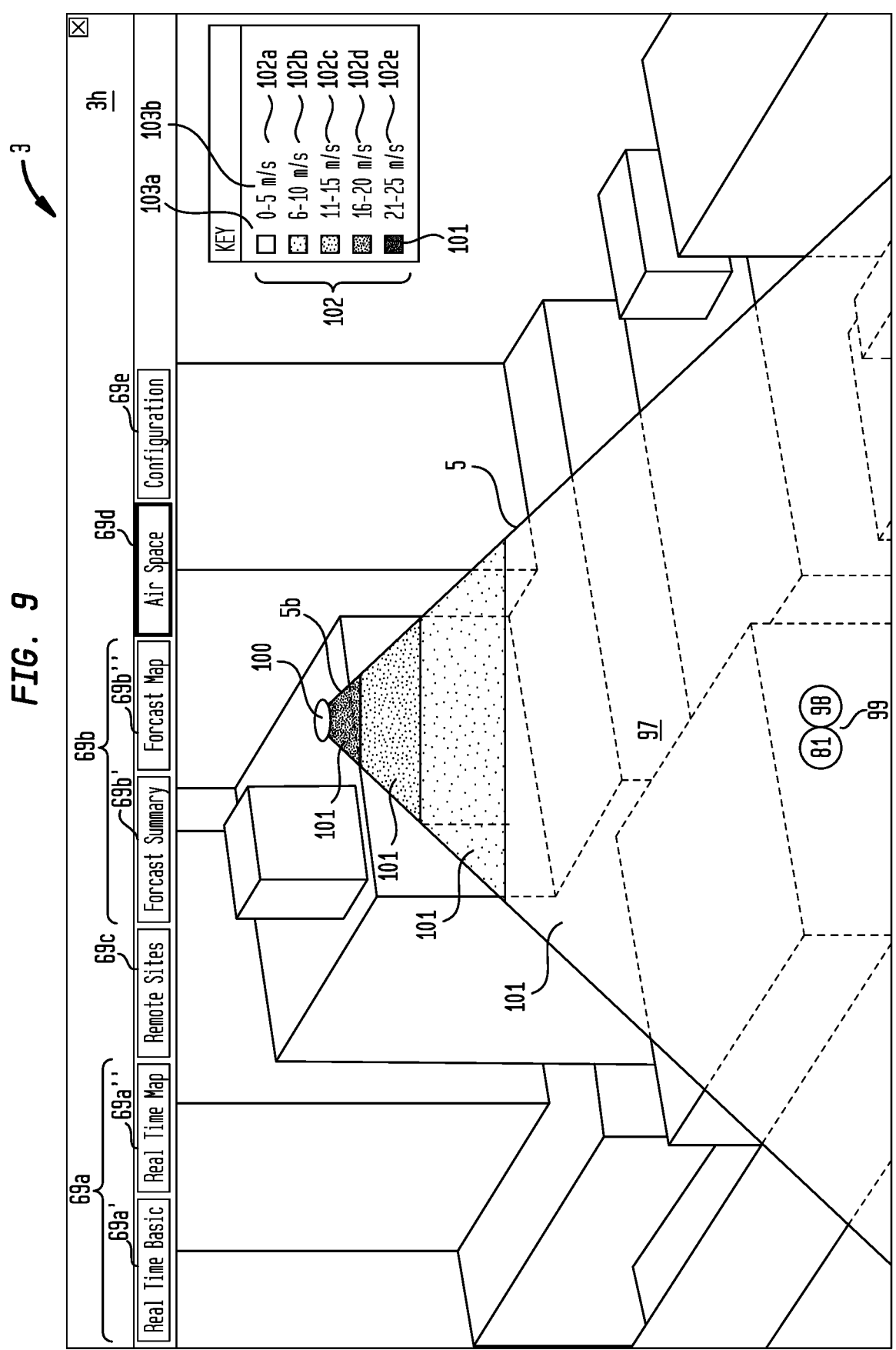
FIG. 9 is an illustration of a graphical user interface displayed on a display surface of a computing device including an embodiment of a page which includes predicted real-time or forecast airflow direction or speed values in one or more two or three-dimensional zones which bound flight corridors for aircraft.
Figure 10:
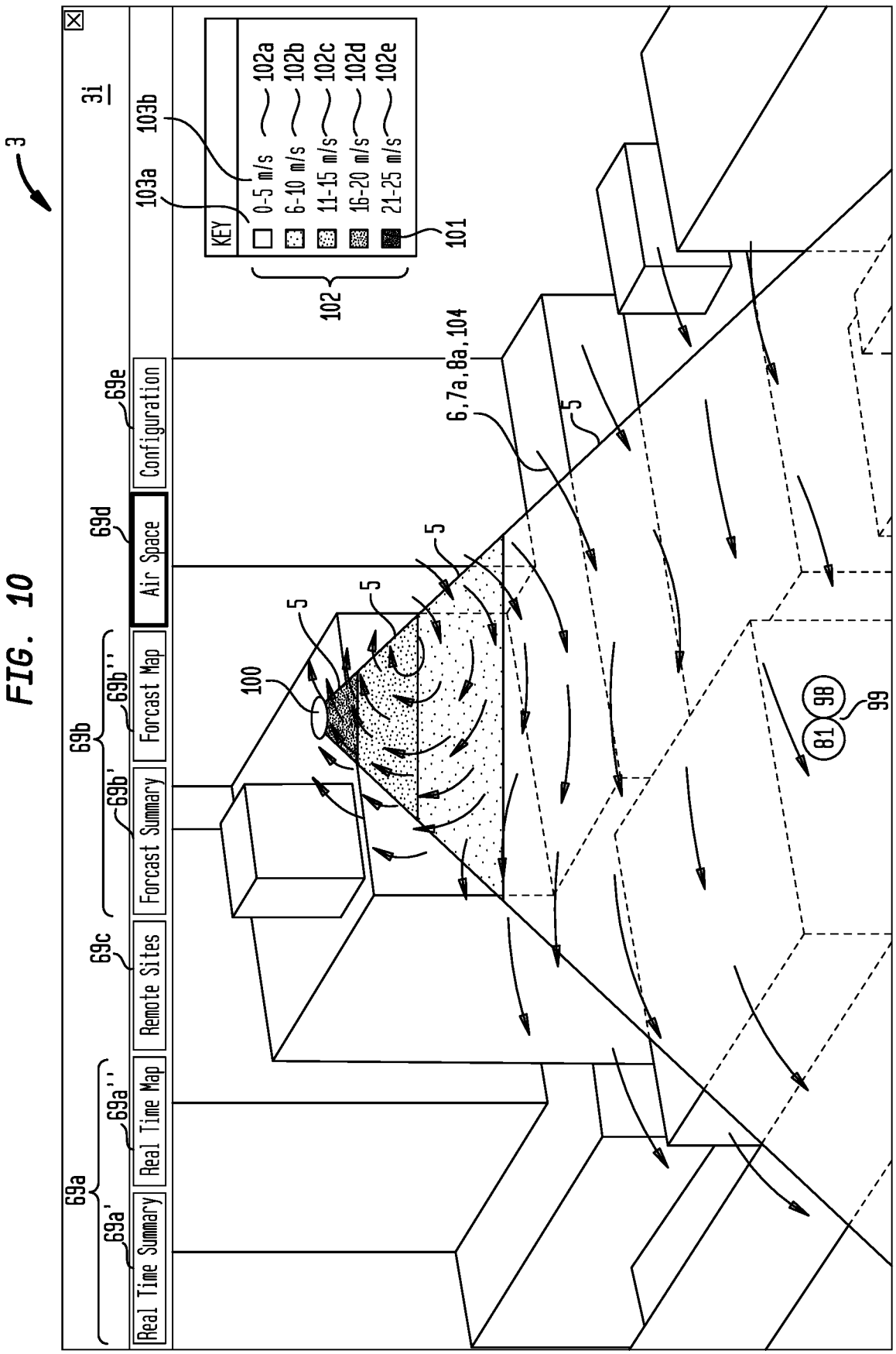
FIG. 10 is an illustration of a graphical user interface displayed on a display surface of a computing device including an embodiment of a page which includes visual indicators of predicted real-time or forecast airflow direction or speed values in one or more two or three-three-dimensional zones which bound flight corridors for aircraft.

For the purpose of this invention the term "zone (5)" means any area or volume or combination thereof which can be delimited in the geographic environment (9). As an illustrative example, with reference primarily to FIGS. 3 and 4, and without limitation in the breadth of the foregoing, a "zone (5)" can be a two-dimensional area such as the vertical or horizontal plane defining all or a part of a side or a top of a building, a pedestrian walkway, a platform, a stage, or surface (as shown in the example of FIG. 3 or 4), or can be a three-dimensional space such as a three-dimensional structure, such as the as building, stadium, arena, or an air space (32) contiguous or discontiguous with the Earth's surface (30), such as, the airspace between structures (as shown in the example of FIG. 4), an air corridor, or flight corridor (as shown in the examples of FIGS. 8 through 10) for travel of aircraft, or the like.

For the purposes of this invention the term "fluid flows" means the interaction or simulated interaction of a fluid in a spatially referenced three-dimensional model (29).

For the purposes of this invention the term "airflow" means the movement of air in the geographic environment (9).

Again, referring primarily to FIG. 1, embodiments of the system (1) can generate predicted real-time or forecast airflow direction or speed values (7)(8) based on actual or simulated interactions of fluid flows (27) in spatially referenced three-dimensional model(s) (29). For the purpose of this invention the term "spatially referenced three-dimensional model" broadly encompasses physical models or computational models such as computational fluid dynamics ("CFD"), model mockup, nodal/zonal model, or combinations thereof, which are modeled on scale.

In wind tunnel modeling, the direct environment, buildings, and other structures or objects can be modeled on scale to provide a spatially referenced three-dimensional model (29) which can be placed in a test section (34) of a wind tunnel (35). In particular embodiments, the spatially referenced three-dimensional model (29) can be placed on a turntable (36) to allow the spatially referenced three-dimensional model (29) to be oriented in different orientations to the fluid flow (27) in the wind tunnel (35).

As an illustrative example, wind tunnel testing can, but need not necessarily, be conducted in accordance with the standards of the American Society of Civil Engineers ("ASCE") or Structural Engineering Institute ("SEI"). In particular embodiments, wind tunnel testing can be conducted pursuant to Standard ASCE/SEI 49-12, "Wind Tunnel Testing for Buildings and Other Structures," or the specifications of ASCE Manual of Engineering Practice No. 67, "Wind Tunnel Studies of Buildings and Structures" or pursuant to the Environmental Protection Agency's ("EPA's") "Guideline for the Use of Fluid Modeling of the Atmospheric Diffusion", each incorporated by reference herein.

A plurality of sensors (37) suitable to sense one or more fluid flow characteristics (38) of the fluid flow (27), such as, speed, acceleration, pressure, turbulence, temperature or other fluid flow characteristics (38), can be located at different location coordinates (28) in the spatially referenced three-dimensional model (29) which correspond to geographic locations (39) in the geographic environment (9). Each of the plurality of sensors (27) can generate a fluid flow signal (40) which can vary based on magnitude of the fluid flow characteristics (38).

In particular embodiments, the fluid flow signal (40) can be received by a fluid flow processing module (41) of the computer program (19). The fluid flow processing module (41) can be executed to convert the fluid flow signal (40) from analog to digital signals and correspondingly convert the digital signals to fluid flow data (26) corresponding to the sensed fluid flow characteristics (38) for each of the plurality of location coordinates (28) in the spatially referenced three-dimensional model (29).

In computational fluid dynamics (CFD) (43), numerical analysis and data structures analyze and solve problems that involve fluid flows (27). Computers are used to perform calculations to simulate the interaction of fluid flows (27) with surfaces to generate fluid flow signals (40) for the computed fluid flow characteristics (38) in the spatially referenced three-dimensional model (29), computer aided design ("CAD") models (44) of the direct or prospective environments or buildings (or of physical three-dimensional models) can be extracted or generated employing computer aided design programs (45). A coordinate system (46) can be assigned to the three-dimensional CAD model (44) to generate a spatially referenced three-dimensional model (29) in which each point in the model space can be assigned location coordinates (28) corresponding to the geographic locations (39) in the geographic environment (9). Computers perform the calculations to simulate the interaction of fluid flows (27) with surfaces defined by the CAD model (44). In certain embodiments, CFD calculations can be performed to simulate fluid flows (27) having different fluid flow characteristics (38) within a three-dimensional CAD model (44) of the spatially referenced three-dimensional model (29).

In particular embodiments, the fluid flow processing module (41) can associate the fluid flow data (26) from CFD corresponding to the computed fluid flow characteristics (38) with each of the plurality of location coordinates (28) (x,y or x,y,z) in the spatially referenced three-dimensional model (29).

Now, referring primarily to FIG. 1, in particular embodiments, an airflow measurement device (49) can measure real-time airflow direction (47) or real-time airflow speed (48) at a geographic location (39) in the geographic environment (9) and generate real-time airflow direction data (47a) or real-time airflow speed data (48a) (or both in discrete streams or a combination thereof) which can be received by the server (10). The computer program (19), can include an airflow direction or speed data receiving module (50), which can be executed to receive the real-time airflow direction or speed data (47a)(48a). The geographic location (39) of the airflow measurement device (49) can, but need not necessarily, be within the geographic environment (9) represented by the spatially referenced three-dimensional model (29). In particular embodiments, the airflow measurement device (49) can be disposed at any geographic location (39) which generates airflow direction or speed data (47a)(48a) capable of correlation with the fluid flow data (26) associated with the all or a portion of the plurality of location coordinates (28) in said spatially referenced three-dimensional model (29) to allow calculation of real-time airflow direction or speed values (7) which correspond to all or a portion of the geographic locations (39) in the geographic environment (9).

For the purposes of this invention the term "airflow measurement device (49)" means any device capable of measuring real-time airflow direction (47) or real-time airflow speed (48) (or both) at a geographic location (39) on or above the Earth's surface (30) defined by location coordinates (28) (x,y or x,y,z) and generating real-time airflow direction data (47a) or real-time airflow speed data (48a) (or both as discrete streams or as combination thereof) which varies based on change in real-time airflow direction (47) or real-time airflow speed (48). Without limitation to the breadth of the foregoing, illustrative examples of airflow measurement devices (49) include cup or rotational anemometers, thermal flow anemometers, windmill anemometers, pressure tube anemometers, ultrasonic anemometers, and laser doppler anemometers, and combinations thereof.

Again, referring primarily to FIG. 1, particular embodiments of the computer program (19), can include an airflow direction or speed data correlation module (51) which functions to correlate the real-time airflow direction or speed data (47a)(48a) generated by the airflow measurement device (49) with corresponding fluid flow data (26) associated with each of the plurality of location coordinates (28) in the spatially referenced three-dimensional model (29) of the geographic environment (9).

For the purposes of this invention, the term "correlation" means a relationship which can be established by operation of the airflow direction or speed data correlation module (51) of the computer program (19) between the airflow direction data or airflow speed data (47a)(48a) generated by an airflow measurement device (49) disposed at geographic location (39) and the fluid flow data (26) associated with all or a portion of the plurality of location coordinates (28) in the spatially referenced three-dimensional model (29) of the geographic environment (9) and which allows use of the correlated fluid flow data (26) to calculate corresponding fluid flow values (42) corresponding to all or a portion of the plurality of location coordinates (28) in the three-dimensional model (29) and which can be subsequently converted to predicted real-time airflow direction or speed values (7) for each corresponding geographic location (39) in the geographic environment (9).

Again, referring primarily to FIG. 1, embodiments of the computer program (19) can, but need not necessarily, include an airflow direction or speed data validation module (52) which functions to validate accuracy of the airflow direction or speed data (47a)(48a) received from each airflow measurement device (49). Based on prior comparisons between real-time airflow direction or speed (47)(48) measured at geographic locations (39) in a geographic environment (9) and the airflow direction or speed data (47a)(48a) generated by each airflow measurement device (49), or based on prior successful or unsuccessful attempts to correlate airflow direction or speed data (47a)(48a) received from particular airflow measurement devices (49) with fluid flow data (26) associated with particular spatially referenced three dimensional model(s) (29) or particular location coordinates (28) within the spatially referenced three dimensional model(s) (29), the airflow direction or speed data validation module (52) can function to selectively receive or exclude (whether in whole or in part) airflow direction or speed data (47a)(48a) from a particular airflow measurement device (49).

As an illustrative example, exclusion of the airflow direction and speed data (47a)(48a) in whole can occur when the airflow measurement device (49) has geographic location (39) in relation to the geographic environment (9) represented by the spatially referenced three-dimensional model (29) which prohibits reliable correlation of the airflow direction or speed data (47a)(48a) with corresponding fluid flow data (26) associated with one or more of the location coordinates (28) associated with the spatially referenced three-dimensional model (29). A partial exclusion can occur when the airflow measurement device (49) generates airflow direction and speed data (47a)(48a) which cannot be reliably correlated with fluid flow data (26) in a particular three-dimensional model (29) under certain conditions in the geographic environment (9) which may occur only as to particular real-time airflow directions (47) or particular real-time airflow speeds (48) or only as to particular combinations of real-time airflow directions (47) or real-time airflow speeds (48).

In particular embodiments, the inclusion or exclusion of airflow direction or speed data (47a)(48a) can be based on pre-assessed accuracy of correlating the airflow direction or speed data (47a)(48a) generated by the airflow measurement device (49) under one or more conditions in the geographic environment (9) with the fluid flow data (26) associated with one location coordinate (28), or a plurality of location coordinates (28), in the spatially referenced three-dimensional model (29) of the geographic environment (9).

Again, referring primarily to FIG. 1, in particular embodiments, the computer program (19) can, but need not necessarily include, an airflow measurement device selection module (53) which functions to select an airflow measurement device (49) from a plurality of airflow measurement devices (49) based on prior validation of the airflow direction or speed data (47a)(48a) received from the airflow measurement device (49). Accordingly, if the system (1) includes more than one airflow measurement device (49a, 49b, 49c, 49d . . . ), and if the airflow speed or direction data (47a)(48a) cannot be validated, or is invalidated, as to a first airflow measurement device (49a), the airflow measurement device selection module (53) can assess the validity of airflow direction or speed data (47a)(48a) which can be received from one or more of a plurality of airflow measurement devices (49), and select to receive airflow direction or speed data (47a)(48a) from a second airflow measurement device (49b) (or more airflow measurement devices (49c, 49d . . . ), to selectively and abuttingly assemble the airflow direction and speed data (47a)(48a) from two or more airflow measurement devices (49a)(49b) to allow substantially continuous correlation of airflow direction or speed data (47a)(48a) with fluid flow data (26) associated with one or more of the plurality of location coordinates (28) in the spatially referenced three-dimensional model (29) of the geographic environment (9).

Again, referring primarily to FIG. 1, embodiments of the computer program (19) can include a fluid flow calculator module (54) which functions based on correlation of the airflow direction or speed data (47a)(48a) with the fluid flow data (26) associated with the spatially referenced three-dimensional model (29) of the geographic environment (9) to calculate fluid flow values (42) corresponding to one or more of the plurality of location coordinates (28) in the spatially referenced three-dimensional model (29).

Again, referring primarily to FIG. 1, embodiments of the computer program (19) can include an fluid flow value conversion module (55) which functions to receive and convert the calculated fluid flow values (42) associated with one or a plurality of location coordinates (28) in the spatially referenced three-dimensional model (29) to predicted real-time airflow direction or speed values (7)(8) (in any coherent system of units) occurring at one or a plurality of geographic locations (39) within the geographic environment (9) corresponding to one or a plurality of location coordinates (28)

in the spatially referenced three-dimensional model (29) of a geographic environment (9).

Embodiments of the invention, afford a substantial advantage over conventional systems in that the airflow direction data or speed data (47a)(48a) generated by one or a reduced number of airflow measurement device(s) (49)(49a, 49b . . . ) disposed at one or a reduced number of geographic location(s) (39), whether located within or outside of a delimited geographic environment (9) represented by the spatially referenced three-dimensional model (29), can be correlated with fluid flow data (26) for all or a portion of the plurality of location coordinates (28) in the spatially referenced three-dimensional model (29) of the geographic environment (9), and which can be utilized to calculate real-time airflow direction or speed values (7) at geographic locations (39) within one or a plurality of geographic environment(s) (9) corresponding to a plurality of location coordinates (28) in one or a plurality of three-dimensional model(s) (29). Thus, there can be an overall increase in mechanical, labor, or cost efficiencies within embodiments of the inventive system (1).

Now referring to FIG. 1, in particular embodiments, one or a plurality of forecasting stations (56) can send forecast airflow direction or speed data (56a)(56b) to the server (10), and the computer program (19), including a forecast airflow direction or speed data receiving module (57), can be executed to receive and process the forecast airflow direction or speed data (56a)(56b) associated with geographic locations (39) in the geographic environment (9). Forecast airflow direction or speed data (56a)(56b) can, but need not necessarily, include forecast airflow direction or speed data (56a)(56b) based on an operational consensus forecast method, which performs a statistical correction of numerical output data from forecast sites followed by weighted average consensus on a daily or hourly basis.

As an illustrative example, Australian Operational Concensus Forecasts ("OCF") at hourly temporal resolution can be used to generate forecasts of temperature, dewpoint temperature, relative, mean sea level pressure, airflow speed and direction for 283 Australian sites. See for example, "*Performance of Hourly Operational Concensus Forecasts (OCFSs) in the Australian Region,*" Chermelle Engel and Elizbeth Ebert, Bureau of Meteorology Research Centre, Melbourne, Victoria, Australia (2007).

Again, referring primarily to FIG. 1, in particular embodiments, the airflow direction or speed data correlation module (57) can, but need not necessarily, function to correlate the forecast airflow direction or speed data (56a)(56b) received from the forecasting stations (56) with the fluid flow data (26) associated with each of said plurality of location coordinates (28) in the spatially referenced three-dimensional model (29) of the geographic environment (9). The validation and correlation of the forecast airflow direction or speed data (56a)(56b) with a plurality of location coordinates (28) in the spatially referenced three-dimensional model (29) can be performed by substantially the same modules and process as above described for the real-time airflow direction and speed data (47a)(47b) received from one or more airflow direction or speed measurement devices (49).

In these particular embodiments, the fluid flow calculator module (54) of the computer program (19) can, based on correlation of the forecast airflow direction or speed data (56a)(56b) with the fluid flow data (26) associated with the spatially referenced three-dimensional model (29) of a geographic environment (9), calculate fluid flow values (42) forecast for each of the location coordinates (28) in the three-dimensional model (29). In turn, the fluid flow value conversion module (55) can correspondingly predict forecast airflow direction and speed values (8) prospectively occurring at one or at a plurality geographic locations (39) in the geographic environment (9).

For the purposes of this invention, the term "airflow direction" means the direction from which the airflow originates. For example, a northerly airflow moves from the north to the south.

For the purposes of this invention, the term "airflow speed" means a rate of the movement of airflow in distance per unit of time.

For the purposes of this invention, the term "airflow mean speed" means a time averaged airflow speed, airflow speed average over a given period of time.

For the purposes of this invention, the term "airflow peak speed" means a highest airflow speed observed during a given period of time.

For the purposes of this invention the term "airflow shear" means the rate of change in the airflow speed as a function of the change in distance, typically, but not necessarily in the vertical direction.

For the purpose this invention, the term "airflow velocity" means the speed of the airflow in a given direction.

For the purpose of this invention, the term "airflow acceleration" means the rate of change (or derivative with respect to time) of velocity. It is thus a scalar quantity with dimension length/time$^2$. In SI units, airflow acceleration is measured in meters/second$^2$.

For the purpose of this invention, the term "airflow pressure" means the total force exerted upon a structure by the airflow.

For the purpose of this invention, the term "airflow turbulence" means that the airflow moves chaotically in all directions.

For the purposes of this invention, predicted real-time or forecast airflow direction or speed values (7)(8) include or consist of absolute or approximate real-time or forecast airflow direction or speed values or derivatives with respect to position or time (such as velocity, acceleration, jerk, jounce thrust, or shear) and combinations thereof, and without limitation to the breadth of the foregoing, predicted airflow direction or speed values can include or consist of: predicted real-time or forecast airflow direction values (7a)(8a), predicted real-time or forecast airflow speed values (7b)(8b), predicted real-time or forecast airflow mean speed values (7b')(8b'), predicted real-time or forecast airflow peak speed values (7b")(8b"), predicted real-time or forecast airflow velocity values (7c)(8c), predicted real-time or forecast airflow acceleration values (7d)(8d), predicted real-time or forecast airflow sheer values (7e)(8e), predicted real-time or forecast airflow pressure values (7f)(8f), predicted real-time or forecast airflow turbulence values (7g)(8g), or derivates and combinations thereof, or other predicted current or forecast environmental values (7h)(8h), such as, air temperature, air moisture, and combinations thereof which can be obtained by processing the magnitude or direction, and combinations thereof, of fluid flows (27) in the spatially referenced three-dimensional model (29). Each of the predicted real-time or forecast air flow values (7)(8) can be converted to any coherent system of units (such as the International System of Units). For example, predicted current airflow speed values (7b) can be expressed in terms of meters per second ("mps"), or can be converted to Imperial Standard Units in which predicted airflow speed values (7)(8) can be expressed in term of miles per hour ("mph").

Determination of predicted current or forecast airflow direction or speed values (7) or (8), or derivatives thereof, can be useful in monitoring or planning of current or forecast airflow value dependent events (58). The term "airflow value dependent event (58)" means a thing, use of a thing, or performance effected by current or forecast airflow direction or speed values (7) or (8) in the geographic environment (9). As an illustrative example, an airflow value dependent event (58), can be the erection, temporal use, or dismantlement of temporary structures in a geographic environment (9) which event depends upon particular airflow direction or speed value requirements (59).

In particular embodiments, the airflow direction or speed value requirements (59) of a current or prospective airflow value dependent event (58) can be currently or prospectively assessed or the airflow value dependent event (58) matched to airflow speed or direction value requirements (59) contained in an airflow value dependent events database (60). For the purpose of this invention, the term "airflow direction or speed value requirements" means one or a delimited range of real-time or forecast airflow direction or speed values (7)(8) necessary for occurrence or prospective occurrence of an airflow value dependent event (58).

Again, referring primarily to FIG. 1, in particular embodiments, the computer program (19) can, but need not necessarily, include an airflow direction or speed value requirements module (61) which functions to compare airflow direction or speed value requirements (59) of an airflow value dependent event (58) to real-time or forecast airflow values (7) or (8) in the geographic environment (9). In particular embodiments, the airflow direction or speed value requirements module (61) can further function to calculate variance between the airflow direction or speed value requirements (59) of the airflow value dependent event (58) and the real-time or forecast airflow values (7)(8) occurring in the geographic environment (9).

Again, referring primarily to FIG. 1, in particular embodiments, the computer program (9) can further include a zone generation module (62) which functions to delimit one or more two or three-dimensional zones (5) within the spatially referenced three-dimensional model (29) of the geographic environment (9) and correspondingly delimits predicted current or forecast airflow values (7)(8) to occurrences within the bounded area or space of each two or three-dimensional zone (5) within the geographic environment (9).

Now referring primarily to FIG. 1, in particular embodiments, the computer program (19) can, but need not necessarily, include a graphical user interface module (63) which functions to display a graphical user interface (3) on a display surface (25) of a computing device (2). The graphical user interface (3) can be implemented using various technologies and different devices, depending on the preferences of the designer and the particular efficiencies desired for a given circumstance. By user command (24) various functions of the computer program (19) can be activated which in part includes the graphical user interface module (63) which functions to display an interactive graphical user interface (3) on a display surface (25) of the computing device (2). For the purposes of this invention the term "user command (24)" means user action which operates a function of the computer program (19) which as an illustrative example can include pressing or releasing the left mouse button (64) while a pointer (65) is located over a control icon (66) (or other interactive field which activates a function) depicted in the graphical user interface (3); however, it is not intended that a "user command (24)" be limited to this illustrative example, rather, the term "user command" is intend to broadly encompass a command by the user (67) through which a function of computer program (19) (or other program, application, module or the like) can be activated or performed, whether through selection of one or a plurality of control icon(s) or fields, or by other forms of user interaction with the graphical user interface (3), such as voice command, keyboard stroke, mouse button, touch on a touch screen, or combinations thereof.

Now generally referring primarily to FIGS. 1 through 11, in particular embodiments, one or more two or three-dimensional zones (5) can be delimited within a graphical representation of the geographic environment (4). The one or more two or three-dimensional zones (5) within the graphical representation of the geographic environment (4) correspondingly delimit the predicted real-time or forecast airflow direction or speed values (7)(8) to occurrences within the one or more two or three-dimensional zones (5) delimited within the graphical representation of the geographic environment (4).

Embodiments of the graphical user interface (3) can vary in regard to the server client user interaction. In particular embodiments, the graphical user interface (3) can include a largely static pages (3a, 3b, 3c, 3d . . . ) in which the user (67) views the graphical representation of the geographic space (4) delimited into one or more two or three-dimensional zones (5) having graphical data periodically updated by the server (10). Alternately, in particular embodiments, the graphical user interface (3) can include pages (3a, 3b, 3c, 3d . . . ) customized by receiving user requested characteristics (68) by user commands (24) in the graphical user interface (3). In particular embodiments, user requested characteristics (68) can, but need not necessarily, include the selection or alteration of the boundaries enclosing the graphical representation of geographic environment (4) or the selection or alteration of the boundaries enclosing each of the graphical representations of the one or more two or three-dimensional zones (5).

Now, generally referring to FIGS. 2 through 11, an illustrative example of a graphical user interface (3) divides client computing device content (20) in the graphical user interface (3) between pages (3a-c) including real time content (20a) depicting predicated real-time airflow values (7) (shown in the examples of FIGS. 2 through 11 as "real time" tabs (69a) selectable by user command (24)) and pages (3e-f) including forecast content (20b) depicting predicted forecast airflow values (8) (shown in the examples of FIGS. 2 through 11 as "forecast" tabs (69b) selectable by user command (24)). Additionally, the illustrative example of a graphical user interface (3) divides "real time" content (20a) into real time summary content (20a') (shown in the examples of FIGS. 2 through 11 as "real-time summary" tabs (69a') selectable by user command (24)) and real-time map content (20a") (shown in the examples of FIGS. 2 through 11 as "real-time map" tabs (69a") selectable by user command (24)).

For the purposes of this invention the term "real time" or "current" means the actual time during which airflow direction or speed occurs in the geographic environment (9) subject to any delay in computer transmission, processing and display of the corresponding data in the graphical user interface (3).

For the purposes of this invention the terms "forecast" or "prospective" means a future time during which airflow direction or speed occurs in the geographic environment (9).

Now referring primarily to FIG. 2, in particular embodiments, upon a client computing device request (68) of the server (10), real-time content (20*a*) pertaining to the geographic environment (9) can be depicted on the display surface (25) of the client computing device (2). In particular embodiments, real-time content (20*a*) pertaining to the geographic environment (9) can include one or more of: temporally updated numerical values (70) in any coherent system of units (such as "meters/second" or "degrees" relative to 0 degrees with cardinal directions North, East, South, West separated by 90 degree increments) pertaining to real-time airflow direction or speed (7*a*)(7*b*)(airflow may also be referred to as "wind"); or numerical values of mean airflow speed (7*b*') or numerical values of peak airflow speed (7*b*") over a selected time period (71) (such as 30 seconds, 1 minute, 10 minute, 1 hour, 8 hours, or 24 hours) where "mean airflow" means the average airflow speed over a time period (71), and where "peak airflow" means the maximum airflow speed occurring within a time period; or temporally updated plots (72) of predicated current airflow speed (7*b*) over a time period (71), and in particular embodiments. the time period (71) can be selectable by user command (24) or can be toggled by user command (24) between plots (72) of airflow measurement device data (49*a*)(49*b*) and processed current airflow speed (7*b*); and other temporally updated numerical values pertaining to measures of conditions in the geographic environment (9) such as air temperature (73), apparent temperature (74) (taking into consideration airflow speed and air humidity), relative humidity (75), dew point (76).

Again referring primarily to FIG. 2, in particular embodiments, upon a client computing device request (68) of the server (10), real-time content (20*a*) pertaining to each of one or more two or three-dimensional zones (5) delimited within the geographic environment (9) can be depicted on the display surface (25) of the client computing device (2) along with temporally updated numerical values (70) of mean airflow speed (7*b*') or numerical values of peak airflow speed (7*b*") within each one of the one or more two or three dimensional zones (5). In the illustrative example of FIG. 2, the graphical representation of the geographic environment (4) includes a plurality of two or three-dimensional zones (5) (the example of FIG. 2 includes eleven zones) associated with a list of zones (77) (Zone 1 through Zone 11) and the corresponding updated numerical values (70) of mean airflow speed (7*b*') and numerical values of peak airflow speed (7*b*").

Now referring primarily to FIG. 3, in particular embodiments, the real-time content (20*a*) can be depicted as a graphical representation of the geographic environment (4) including a delimited plurality of two or three-dimensional zones (5) on the display surface (25) of the client computing device (2) (also referred to as a "real time map"). In the particular embodiment of FIG. 3, each of the plurality of zones (5) can be depicted as two dimensional zones (whether in plan view, perspective view, or other view) (also referred as "surface level zones" or "ground level zones") having a boundary which delimits a two-dimensional area; however, a two dimensional zone typically represents predicted real-time airflow direction or speed (7*a*) or (7*b*) within a defined elevation, such as, between the surface to an elevation of about 5 meters or other defined elevation which can be greater or less than about 5 meters). The zone generation module (62) of the computer program can further function to depict a zone selector (78) in the graphical user interface (3) which by user command (24) selects one of the plurality of two or three-dimensional zones (5) delimited in the graphical representation of the geographic environment (4) causing further depiction of updated numeric values (70) of predicted current mean airflow speed (7*b*') or numeric values of peak airflow speed (7*b*") (each based on one or more time periods such as 10 seconds, 1 minute, 10 minutes, 1 hour, 8 hours, or 24 hours) or airflow direction (7*a*') occurring in the selected two or three dimensional zone (5) within the geographic environment (9).

Now referring primarily to FIG. 4, each of the plurality of two or three-dimension zones (5) can occur on or between a structure surfaces (79) as opposed to a terrestrial surface (80). In the illustrative example, the plurality of two or three-dimensional zones (5) occur on the roof surface(s) of a building(s) or between vertical building surfaces. The predicted current airflow direction or speed (7*a*')(7*b*') within a two or three-dimensional zone (5) can be useful in determining flight parameters for aircraft (81). Without limitation to the breadth of the foregoing, as one example, in determining flight parameters of vertical take-off and landing aircraft (98) including fixed wing aircraft, helicopters, and other aircraft with powered rotors.

Figure 5:
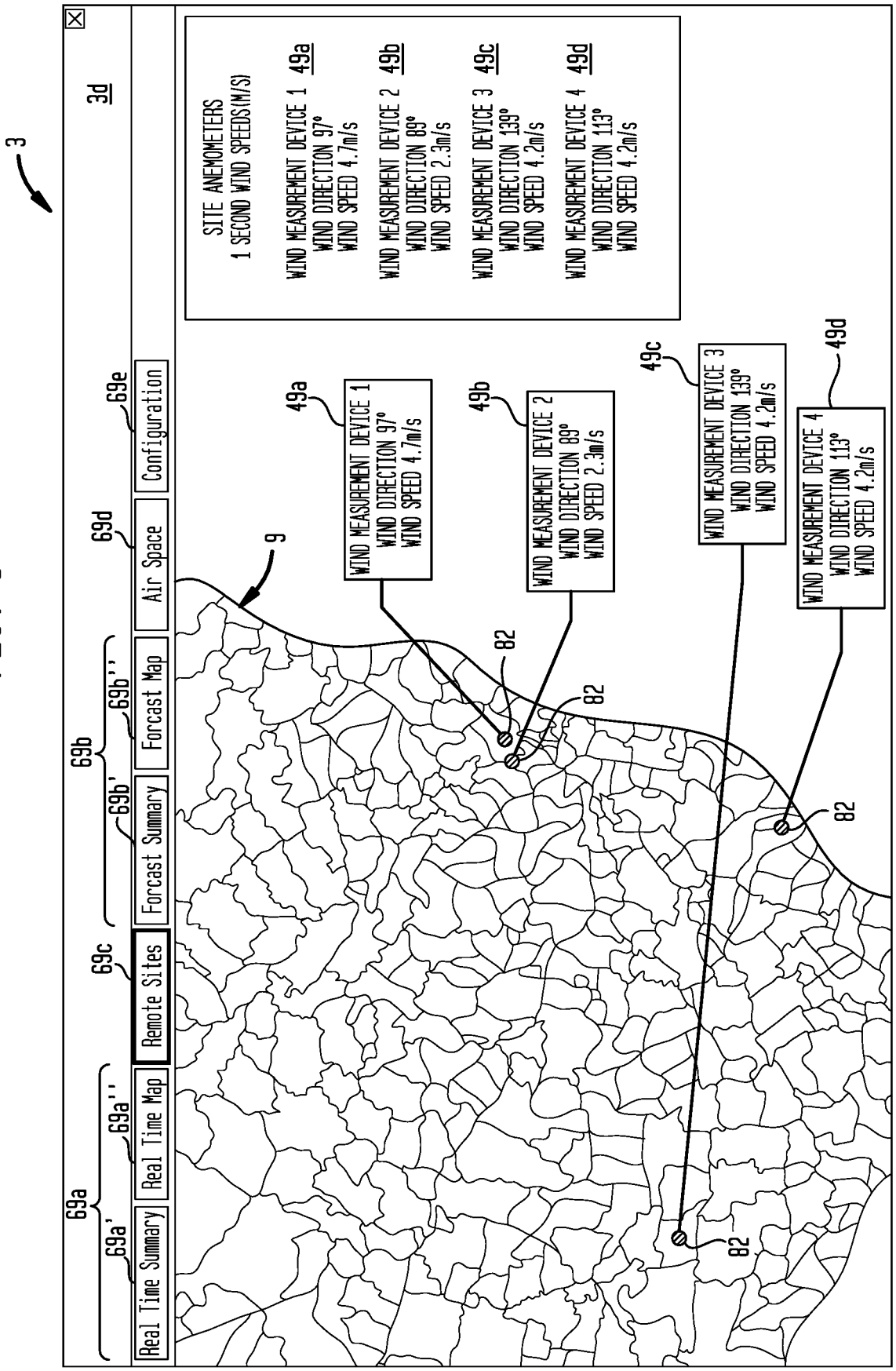
FIG. 5 is an illustration of a graphical user interface displayed on a display surface of a computing device including an embodiment of a page which includes a representation of a geographic environment depicting geographic location indicators identifying geographic locations of a plurality of airflow measurement devices.

Now referring primarily to FIG. 5, in particular embodiments of a graphical user interface (3) a page (3*d*) selectable by user command (24) (as shown by the illustrative example of FIG. 5 a "Remote Sites" tab (69*c*) can depict a graphical representation of a geographic area (4) or geographic map including airflow measurement device location indicators (82) which indicate geographic locations (39) of the airflow measurement devices (49) which generate airflow direction or speed data (49*a*-*b*) capable of or being used in correlation with the fluid flow data (26) associated with a geographic environment (9), or one more zones (5) delimited in the geographic environment (9), depicted in the graphical user interface (3). The page (3*d*) can further depict current airflow direction (7*a*) or current airflow speed (7*b*) measured by each airflow measurement device (49) at each geographic location (39) corresponding to the airflow measurement device location indicator (82).

Figure 6:
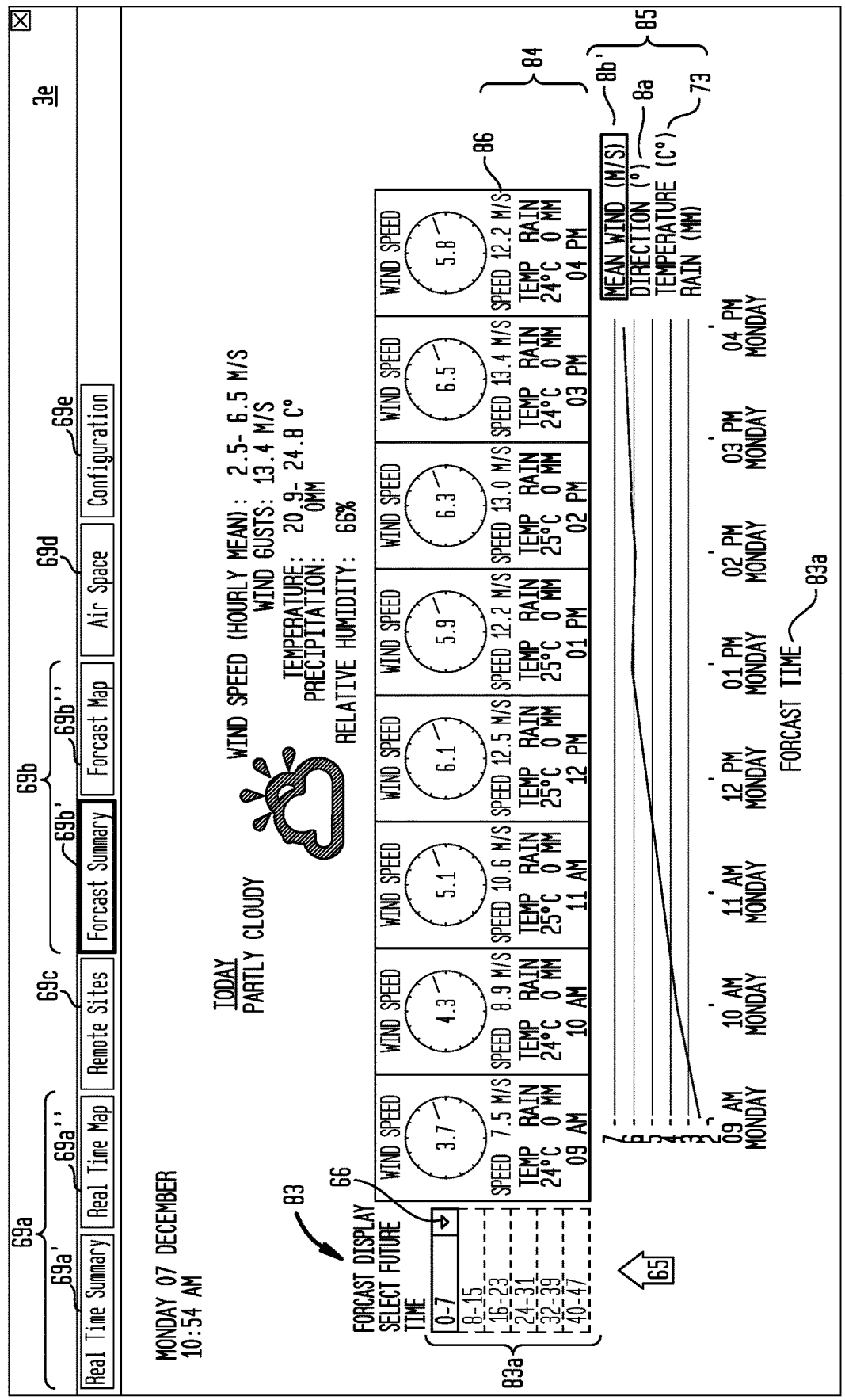
FIG. 6 is an illustration of a graphical user interface displayed on a display surface of a computing device including an embodiment of a page which includes predicted forecast airflow direction or speed values in the geographic environment.
Figure 7:
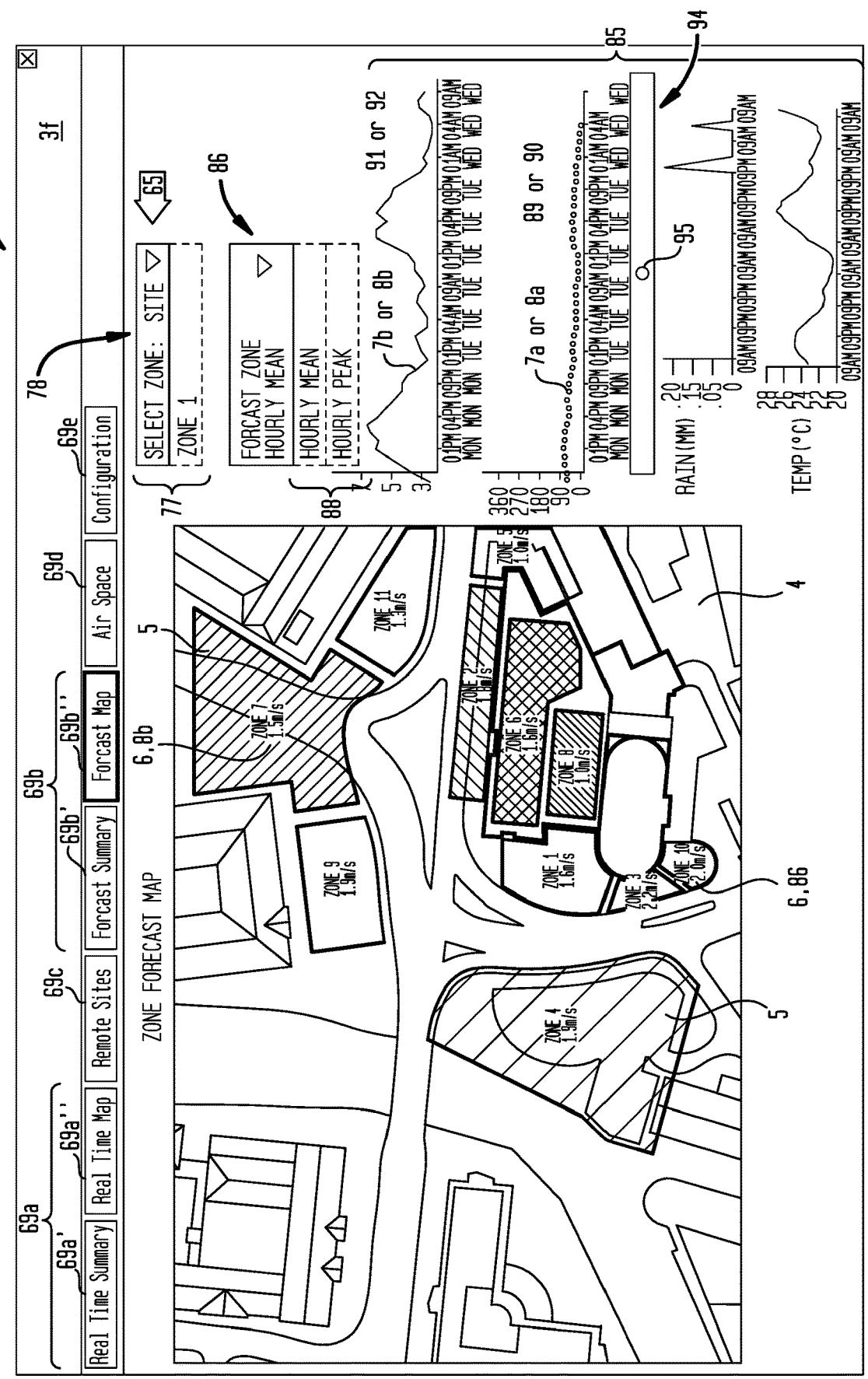
FIG. 7 is an illustration of a graphical user interface displayed on a display surface of a computing device including an embodiment of a page which includes predicted forecast airflow direction or speed values in one or more two or three-dimensional zones disposed on terrestrial or manmade surfaces in a graphical representation of the geographic environment.

Now referring primarily to FIGS. 6 and 7, in particular embodiments, the graphical user interface (3) can by user command (24) display pages (3*e-f*) depicting predicted forecast airflow values (8). As shown in the illustrative examples of FIGS. 6 and 7, a "Forecast Summary" tab (69*b*') or "Forecast Map" tab (69*b*") can be selected by user command (24)).

In the illustrative example of FIG. 6, the graphical user interface module (63) functions to depict a forecast time period selector (83) which by user command (24) allows selection of a forecast time period (83*a*) which causes updated numerical values of predicted forecast airflow direction and speed values (84) (such as numerical values of predicted forecast mean airflow direction or speed (8*a*') (8*b*')), or plots of predicated forecast airflow direction and speed (85) (such as plots of predicted mean airflow direction or speed (8*a*')(8*b*') to be depicted at a selected temporal resolution within the selected forecast time period (83) which pertain to the geographic environment (9) graphically represented in the graphical user interface (3).

Now referring primarily to FIG. 7, in particular embodiments, upon a client computing device request (68) of the server (10), forecast content (20*b*) pertaining to each of one or more two or three-dimensional zones (5) delimited within the graphical representation of the geographic environment (4) can be depicted on the display surface (25) of the client computing device (2). In particular embodiments, the zone selector (78) can be depicted and by user command (24) one of the plurality of zones (5) delimited within the graphical representation of the geographical environments (4) can be selected to cause depiction of the corresponding updated numerical values of predicted forecast airflow direction or speed (84) (which in the illustrative example of FIG. 7 depicts the forecast airflow speed (8*b*) in the graphical representation of the one or more zones (5)) or plots of predicted forecast wind direction or speed (85) over a selected forecast time period (83*a*). As shown in the illustrative example of FIG. 7, the zone selector (78) take form of a drop-down list of zones (77).

In the illustrative example of FIG. 7, a user (67) by user command (24) can select a type of forecast airflow direction or speed (8*a*)(8*b*) to be plotted against the selected forecast time period (83*a*) (as shown in the illustrative example of FIG. 7 "airflow mean direction and speed (87)" or "airflow peak direction and speed (88)" can be selected from a drop-down list of types of forecast airflow direction or speed (86) causing corresponding depiction of a plots of airflow mean direction and speed (89) and (90) or plots of airflow mean direction and speed (89) and (90) over the selected forecast time period (83*a*).

In particular embodiments, a forecast time selector (94) can be depicted and by user command (24) selection can be made of a forecast time (95). In the illustrative example of FIG. 7, the forecast time selector (94) takes the form of a forecast time slider (96) movably aligned to forecast times (95) within the forecast time period (83*a*) of the plot (89-92); however, these illustrative examples of drop down lists or forecast time slider are not intended to preclude selection of forecast content (20*b*), forecast time period (83*a*), or forecast times (95) by other manner of user command (24).

Now, referring primarily to FIGS. 8 and 9, in particular embodiments, the one or more of the two or three-dimensional zones (5) can comprise graphical representations of one or more flight corridor(s) (97) of aircraft (81), or portions thereof, such as an ascent take-off path (97*a*) or a descent glide path (97*b*) delimited within the graphical representation of the geographic environment (4) depicted in the graphical user interface (3) on the display surface (25) of a client computing device (3). In particular embodiments, each flight corridor (97) can be subdivided into additional two or three-dimensional zones (5), such as, an ascent take-off zone (5*a*), descent glide slope zone (5*b*), or other zones in the flight corridor (97). The one or more two or three-dimensional zones (5) delimited within graphical representation of a flight corridor (97) can correspondingly delimit the predicted current or predicted forecast airflow values (7)(8) to the corresponding portions of the flight corridor (97). For the purposes of this invention the term "flight corridor" means the designated region of airspace (32) that aircraft (81) must remain in during transit through the geographic environment (9).

Now referring primarily to FIG. 9, in particular embodiments, the one or more two or three-dimensional zones (5) delimited in the graphical representation of a flight corridor (97) can, but need not necessarily, be depicted as viewed along the longitudinal axis of the flight corridor (97) between the current aircraft location (99) of the aircraft (81) and toward a prospective aircraft location (100).

Now referring primarily to FIGS. 8 and 9, in particular embodiments, each of the one or more two or three-dimensional zones (5) within a flight corridor (97) (or other graphical representation of one or more two or three-dimensional zones (5) delimited in a geographic environment (9)) can include visual indicia (101) of predicted current or forecast airflow values (7)(8) (in the example FIGS. 8 and 9 the visual indicia (101) each correspond to one of a plurality of airflow speed ranges (102)). The visual indicia (101) within the graphical representation of the flight corridor (97) (or other graphical representation of a geographic environment (4) including one or more two or three-dimensional zones (5)) can, but need not necessarily, be density of stipple, color shade or hue or other visual indicia which can be correlated with and visually distinguish each one of the plurality of airflow speed ranges (102). Each airflow speed range (102*a*, 102*b*, 102*c* . . . ) can be defined by a pair of airflow speed threshold values (103*a* and 103*b*) (as shown in the illustrative example of FIG. 8, the key includes five airflow speed ranges (102) each correspondingly visually distinguishable by a density of stipple, with increasing stipple indicating increase in airflow speed); however, the illustrative example of visual indicia (101) as stipple effect is not intended to preclude embodiments in which the visual indicia (101) comprises stipple size, stipple density, cross hatch, express numerals or symbols, or other visual indicia (101) such a vector arrows (104), as shown in the illustrative example of FIG. 10, which vary with predicted current airflow speed and direction (7*a*)(7*b*)(or other real-time or forecast airflow values (7)(8).

In particular embodiments, the one or more two or three-dimensional zones (5) depicted within the graphical representation of the geographic environment (4) can delimit the entirety of a corresponding one or more flight corridors (97). As to these embodiments, the flight corridor (97) may not be subdivided into fixed zones, but rather, the visual indicia (101) along the flight corridor (97) can vary corresponding to airflow range (102) which encompasses the predicted real-time or forecast direction or speed range (102).

Figure 11:
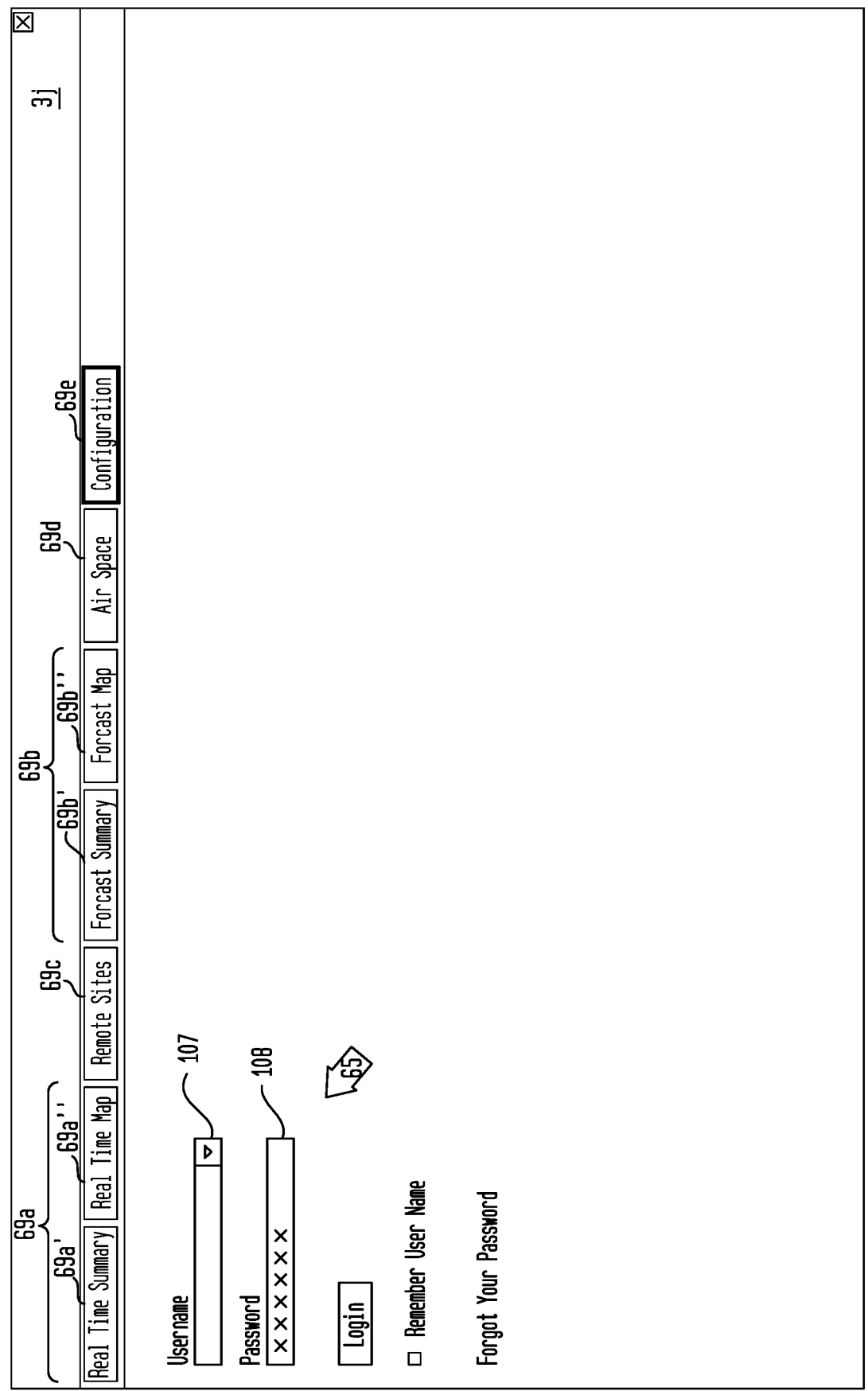
FIG. 11 is an illustration of a graphical user interface displayed on a display surface of a computing device including an embodiment of a page which includes login elements which allows a client computing device to authenticate an account with a server device.

Now, referring primarily to FIG. 11, the system (1) can, but need not necessarily, have a structure that partitions tasks or workloads between a provider(s) of a service for predicting current or forecast airflow values (7)(8), referred to as servers (10), and a plurality of service requesters, called clients (2). As above described, clients (2) and servers (10) communicate over a network (12) on separate hardware. A server (10) runs the computer program (19) which shares server resources (16) with a plurality of clients (2). Typically, the client does not share any of its resources, but requests a server's content or service function. Clients therefore initiate communication sessions with servers which await incoming requests. Embodiments of the computer program (19) can, but need not necessarily, include a login module (105) which upon execution depicts a login page (3*j*) in the graphical user interface (3) which by user command (24) allows the client to log into an account (106) (as shown in the illustrative example of FIG. 1). To log in to an account (106), a client (2) is typically required to authenticate itself with a user name (107) and password (108) or other credentials, such as fingerprint or facial recognition, for the purposes of accounting, security, and resource management. Once the client has logged on, the system (1) will often use a user identifier such as an integer to refer to them, rather than their username, through a process known as identity correlation.

As can be easily understood from the foregoing, the basic concepts of the present invention may be embodied in a variety of ways. The invention involves numerous and varied embodiments of a zone specific airflow condition forecast system and methods for making and using such zone specific airflow condition forecast system including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "forecast" should be understood to encompass disclosure of the act of "forecasting"—whether explicitly discussed or not—and, conversely, were there effectively disclosure of the act of "forecasting", such a disclosure should be understood to encompass disclosure of a "forecast" and even a "means for forecasting." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the zone specific airflow forecast systems herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. A system, comprising:
  a database containing fluid flow data associated with a spatially referenced three-dimensional model of a geographic environment;
  an airflow measurement device disposed at a geographic location which generates airflow direction or speed data capable of correlation with said fluid flow data associated with a plurality of location coordinates in said spatially referenced three-dimensional model to calculate corresponding airflow direction or speed values or derivatives at each of said plurality of location coordinates;

a processor communicatively coupled to a non-transitory computer readable media containing a computer program including:

a zone generator which functions to delimit one or more two or three-dimensional zones within a graphical representation of said geographic environment by user indications in a graphical user interface displayed on a display surface of a computing device;

an airflow direction or speed data receiver which functions to receive said an airflow direction or speed data generated by said airflow measurement device;

an airflow direction or speed data correlator which functions to correlate said airflow direction or speed data generated by said airflow measurement device with said fluid flow data associated with each of said plurality of location coordinates in said spatially referenced three-dimensional model of said geographic environment;

an airflow direction or speed value calculator which functions based on correlation of said airflow direction or speed data with said fluid flow data associated with said spatially referenced three-dimensional model of a geographic environment to calculate said airflow direction or speed values at each of said plurality of location coordinates in said three-dimensional model;

an airflow direction and speed predictor which functions to predict said airflow direction or speed occurring in each of said one or more two or three-dimensional zones within said geographic environment based on said airflow direction or speed values calculated at each of said plurality of location coordinates in said spatially referenced three-dimensional model of a geographic environment; and an airflow direction or speed data validator which functions to validate accuracy of airflow direction or speed data associated with said airflow measurement device based on pre-assessed accuracy of correlating said airflow direction or speed data generated by said airflow measurement device with said fluid flow data associated with each of said plurality of location coordinates in said spatially referenced three-dimensional model of said geographic environment.

2. The system of claim 1, further comprising an airflow measurement device which functions to select said airflow measurement device from a plurality of airflow measurement devices based on prior validated accuracy of said airflow direction or speed data associated with said airflow measurement device.

3. The system of claim 2, wherein said an airflow direction or speed data validator further functions to combine said airflow direction or speed data generated by selected said plurality of airflow measurement devices to provide substantially continuous correlation of said airflow direction or speed data with said fluid flow data associated with each of said plurality of location coordinates in said spatially referenced three-dimensional model of said geographic environment.

4. The system of claim 3, further comprising:

an airflow direction or speed forecast data receiver which functions to receive airflow direction or speed forecasts from forecasting stations;

wherein said airflow direction or speed data correlator functions to correlate said airflow direction or speed forecast data received from said forecasting stations with said fluid flow data associated with each of said plurality of location coordinates in said spatially referenced three-dimensional model of said geographic environment;

wherein said airflow direction or speed value calculator functions to calculate said airflow direction or speed values at each of said plurality of location coordinates in said three-dimensional model based on correlation of said airflow direction or speed forecast data with said fluid flow data associated with said spatially referenced three-dimensional model of a geographic environment; and wherein said airflow direction and speed predictor functions to forecast said airflow direction or speed prospectively occurring in each of said one or more two or three-dimensional zones within said geographic environment based on said airflow direction or speed values calculated at each of said plurality of location coordinates in said spatially referenced three-dimensional model of a geographic environment.

5. The system of claim 4, further comprising:

a forecast time selector generator which functions to depict a forecast time selector in said graphical user interface operable by user interaction to select a forecast time; and wherein said airflow speed or direction indicator generator functions to depict said visual indicators of said airflow speed or direction to prospectively occur in said one or more two or three-dimensional zones delimited in said graphical representation of said geographic environment based on said forecast time selected by user interaction with said forecast time selector.

6. The system of claim 5, wherein a forecast time selector generator depicts said forecast time selector as a slider movable by user interaction within a time period, wherein position of said slider within said time period selects said forecast time.

7. The system of claim 1, further comprising an airflow direction or speed requirements analyzer which functions to compare airflow direction or speed requirements of an airflow direction or speed dependent event prospectively occurring in said one or more three-dimensional zones with said forecast airflow direction or speed to prospectively occur in said one or more two or three-dimensional zones.

8. The system of claim 7, wherein said airflow direction or speed requirements analyzer further functions to calculate variance between said airflow direction and speed requirements of said airflow direction and speed dependent event and said forecast airflow direction or speed prospectively occurring in said one or more two or three-dimensional zones.

9. The system of claim 8, wherein said airflow direction or speed requirements of said airflow direction or speed dependent event received from an airflow direction or speed requirements database.

10. The system of claim 1, further comprising an airflow speed or direction indicator generator which functions to depict in said graphical user interface visual indicators of said airflow speed or direction occurring in said two or three-dimensional zones delimited in said graphical representation of said geographic environment.

11. The system of claim 10, wherein said airflow speed or direction indicator generator further executable to depict visual indicators of said airflow speed or direction in said two or three-dimensional zones corresponding to said airflow direction or speed predicted or forecast at each of said plurality of location coordinates spatially referenced to said three-dimensional model.

12. A computer, comprising:
a processor communicatively coupled to a non-transitory computer readable media containing a computer program executable to:
display a graphical user interface on a display surface of a computing device which by user interaction delimits one or more two or three-dimensional zones within a graphical representation of a geographic environment;
receives fluid flow data associated with a spatially referenced three-dimensional model of said geographic environment;
receives airflow direction or speed data from an airflow measurement device disposed at a geographic location, said airflow direction or speed data capable of correlation with said fluid flow data to calculate corresponding airflow direction or speed values at each of a plurality of location coordinates within said spatially referenced three-dimensional model of said geographic environment;
correlates said airflow direction or speed data generated by said airflow measurement device with said fluid flow data associated with each of said plurality of location coordinates in said spatially referenced three-dimensional model of said geographic environment;
calculates said airflow direction or speed values at each of said plurality of location coordinates in said three-dimensional model based on correlation of said airflow direction or speed data with said fluid flow data associated with said spatially referenced three-dimensional model of a geographic environment; and
predicts said airflow direction or speed occurring in each of said one or more two or three-dimensional zones within said geographic environment based on said airflow direction or speed values calculated at each of said plurality of location coordinates in said spatially referenced three-dimensional model of said geographic environment; and
validates accuracy of airflow direction or speed data associated with said airflow measurement device based on pre-assessed accuracy of correlating said airflow direction or speed data generated by said airflow measurement device with said fluid flow data associated with each of said plurality of location coordinates in said spatially referenced three-dimensional model of said geographic environment.

13. The computer of claim 12, wherein said computer program further executable to correlate said airflow direction or speed data prior validated with said fluid flow data associated with each of said plurality of location coordinates in said spatially referenced three-dimensional zone model.

14. The computer of claim 13, wherein said computer program further executable to:
select said airflow measurement device from which to receive said airflow direction or speed data based on validation of said airflow direction or speed data generated by each of a plurality of airflow measurement devices; and
receive said airflow direction or speed data from said airflow measurement device selected from said plurality of airflow measurement devices.

15. The computer of claim 14, wherein said computer program further executable to:
combine said airflow direction or speed data generated by said plurality of airflow measurement devices selected from said plurality of airflow measurement devices; and
generate substantially continuous correlation of said airflow direction or speed data generated by said plurality of airflow measurement devices with said fluid flow data associated with each of said plurality of location coordinates in said spatially referenced three-dimensional model of said geographic environment.

16. The computer of claim 12, wherein said computer program further executable to:
receive fluid flow data associated with a spatially referenced three-dimensional model of said geographic environment;
receive airflow direction or speed forecast data from forecasting stations;
correlate said airflow direction or speed forecast data received from said forecasting stations with said fluid flow data associated with each of said plurality of location coordinates in said spatially referenced three-dimensional model of said geographic environment;
calculate said airflow direction or speed values at each of said plurality of location coordinates in said three-dimensional model based on correlation of said airflow direction or speed forecast data with said fluid flow data associated with said spatially referenced three-dimensional model of a geographic environment; and
forecast said airflow direction or speed prospectively occurring in each of said one or more two or three-dimensional zones within said geographic environment based on said airflow direction or speed values calculated at each of said plurality of location coordinates in said spatially referenced three-dimensional model of a geographic environment.

17. The computer of claim 12, wherein said computer program further executable to:
compare airflow direction or speed requirements of an airflow direction or speed dependent event prospectively occurring in said one or more three-dimensional zones with said forecast airflow direction or speed to prospectively occur in said one or more two or three-dimensional zones.

18. The computer of claim 17, wherein said computer program further executable to calculate variance between said airflow direction and speed requirements of said airflow direction and speed dependent event and said forecast airflow direction or speed prospectively occurring in said one or more two or three-dimensional zones.

19. The computer of claim 18, wherein said airflow direction or speed requirements of said airflow direction or speed dependent event received from an airflow direction or speed requirements database.

20. The computer of claim 12, wherein said computer program further executable to depict in said graphical user interface visual indicators of said airflow speed or direction occurring in said two or three-dimensional zones delimited in said graphical representation of said geographic environment.

21. The computer of claim 20, wherein said computer program further executable to depict in said graphical user interface said visual indicators of said airflow speed or direction to prospectively occur in said one or more two or three-dimensional zones delimited in said graphical representation of said geographic environment.

22. The computer of claim 12, wherein said computer program further executable to:
- depict a forecast time selector in said graphical user interface operable by user interaction to select a forecast time; and
- wherein said airflow speed or direction indicator generator functions to depict said visual indicators of said airflow speed or direction to prospectively occur in said one or more two or three-dimensional zones delimited in said graphical representation of said geographic environment based on said forecast time selected by user interaction with said forecast time selector.

23. The computer of claim 22, wherein said computer program further executable to depict said forecast time selector as a slider movable by user interaction within a time period, wherein position of said slider within said time period selects said forecast time.

\* \* \* \* \*